United States Patent
Degtiarenko et al.

(10) Patent No.: US 11,726,219 B2
(45) Date of Patent: Aug. 15, 2023

(54) MULTIMODAL PHOTON AND NEUTRON IMAGING DEVICES WITH FAST EVENT-BY-EVENT MULTISAMPLING READOUT AND OPTIMIZED PARTICLE TYPE DISCRIMINATION

(71) Applicant: JEFFERSON SCIENCE ASSOCIATES, LLC, Newport News, VA (US)

(72) Inventors: Pavel V. Degtiarenko, Williamsburg, VA (US); Igor Musatov, Suffolk, VA (US)

(73) Assignee: JEFFERSON SCIENCE ASSOCIATES, LLC, Newport News, VA (US)

( * ) Notice: Subject to any disclaimer, the term of this patent is extended or adjusted under 35 U.S.C. 154(b) by 58 days.

(21) Appl. No.: 17/536,490

(22) Filed: Nov. 29, 2021

(65) Prior Publication Data
US 2022/0206169 A1    Jun. 30, 2022

Related U.S. Application Data

(60) Provisional application No. 63/131,051, filed on Dec. 28, 2020.

(51) Int. Cl.
| | |
|---|---|
| *G01T 1/22* | (2006.01) |
| *G01T 1/20* | (2006.01) |
| *G01T 3/06* | (2006.01) |

(52) U.S. Cl.
CPC .............. *G01T 1/22* (2013.01); *G01T 1/2006* (2013.01); *G01T 3/06* (2013.01)

(58) Field of Classification Search
CPC ............ G01T 1/22; G01T 1/2006; G01T 3/06
See application file for complete search history.

(56) References Cited

U.S. PATENT DOCUMENTS

| | | | |
|---|---|---|---|
| 8,648,314 B1 | 2/2014 | Degtiarenko et al. | |
| 2012/0256094 A1* | 10/2012 | Pozzi | G01V 5/0091 250/366 |

(Continued)

OTHER PUBLICATIONS

V. Popov et al., "New Detector for use in Fast Neutron Radiography", Journal of Instrumentation, Jan. 2011, 1-10, IOP Publishing Ltd and SISSA.

(Continued)

*Primary Examiner* — David P Porta
*Assistant Examiner* — Gisselle M Gutierrez (57) ABSTRACT

A particle imaging method for distinguishing between types of incident particles, such as neutrons, photons, and alphas, and improving the position resolution of particle imaging devices with matrix readout. The method includes high frequency multisampling readout electronics that provides the sequences of multiple measurements for each detected event, resulting in recorded detailed waveform information describing the signals. Such detailed information is used to approximate each signal waveform with a parameterized function in which the extracted parameter sets determine the type of the incident particle in an optimized fashion. The detailed event-by-event multisampling information for each signal readout channel in the matrix readout of the radiation imaging devices improves and optimizes the position resolution for variable shapes of the signals. Such devices can be used in mixed radiation fields, creating a new class of multimodal photon and neutron imagers.

4 Claims, 7 Drawing Sheets

General schematic of the multimodal radiation imager.

(56) References Cited

U.S. PATENT DOCUMENTS

2016/0133447 A1* 5/2016 Degtiarenko .......... G01T 1/185
250/375
2018/0299570 A1* 10/2018 Degtiarenko ............ G01T 3/00

OTHER PUBLICATIONS

G.H.V.Bertrand, et al., "Pulse shape discrimination between (fast or thermal) neutrons and gamma . . . ", Nuclear Instruments and Methods in Physics Research A776 (2015) 114-128.
C.M.Whitney et al., "Gamma-neutron imaging system utilizing pulse shape discrimination with CLYC", Nuclear Instruments and Methods in Physics Research A784 (2015) 346-351.

* cited by examiner

Figure 1. Typical simulated fast neutron signal in stilbene as measured by a 1 GHz multisampling data acquisition hardware.

Figure 2. Typical simulated photon signal waveform in stilbene as measured by a 1 GHz multisampling data acquisition hardware.

Figure 3. Typical simulated fast neutron signal waveform in stilbene as measured by a 10 GHz multisampling data acquisition hardware.

Figure 4. Typical simulated photon signal waveform in stilbene as measured by a 10 GHz multisampling data acquisition hardware.

X and $C_X$ parameters: best approximation of $A(t) - B(t)$ function by $X \cdot H(t) + C_X$ with $H(t) = A(t) + B(t)$
Y and $C_Y$ parameters: best approximation of $C(t) - D(t)$ function by $Y \cdot V(t) + C_Y$ with $V(t) = C(t) + D(t)$ Figure 5. General schematic of the multimodal radiation imager.

Figure 6. Illustration for the multisampling method of coordinate reconstruction in a radiation imaging device. Seven typical simulated fast neutron interaction events in stilbene, located at different values of x coordinate, produced signal waveforms in the matrix readout and were measured by a 1 GHz multisampling data acquisition hardware. Difference between signal waveforms A(t) and B(t) characterizing x coordinate is plotted and approximated using the fitting function f(t) = X*S(t) + C, where S(t) is the sum of the two signal waveforms and X and C are the two optimized parameters. Parameter X characterizes the interaction event position along the x direction, and parameter C characterizes possible constant biases of the measured waveforms.

Figure 7. Illustration for the multisampling method of coordinate reconstruction in a radiation imaging device. Seven typical simulated photon interaction events in stilbene, located at different values of x coordinate, produced signal waveforms in the matrix readout and were measured by a 1 GHz multisampling data acquisition hardware. Difference between signal waveforms A(t) and B(t) characterizing x coordinate is plotted and approximated using the fitting function f(t) = X*S(t) + C, where S(t) is the sum of the two signal waveforms and X and C are the two optimized parameters. Parameter X characterizes the signal position along the x direction.

MULTIMODAL PHOTON AND NEUTRON IMAGING DEVICES WITH FAST EVENT-BY-EVENT MULTISAMPLING READOUT AND OPTIMIZED PARTICLE TYPE DISCRIMINATION

This application claims the priority of Provisional U.S. Patent Application Ser. No. 63/131,051 filed Dec. 28, 2020.

The United States Government may have certain rights to this invention under Management and Operating Contract No. DE-AC05-06OR23177 from the Department of Energy.

FIELD OF THE INVENTION

The present invention relates to radiation monitoring devices and, more particularly, to a method for better distinguishing between various types of incident particles, such as neutrons, photons, and alphas, and to improving position resolution of particle imaging devices with a matrix readout.

BACKGROUND OF THE INVENTION

Current state of the art radiation imaging devices do not distinguish between the images produced by neutrons and photons. Neutron radiation imaging frequently have problems in the presence of significant photon backgrounds. This presents a significant shortcoming of neutron radiation imaging when irradiation happens in a mixed radiation field.

Accordingly, there is a need to further optimize the particle image reconstruction capabilities of neutron imaging devices and to provide them with the capability to discriminate between neutrons and photons. Using a multimodal radiation imaging system would help overcome a frequent problem with the neutron radiation imaging is the presence of significant photon backgrounds.

It is therefore the purpose of the present invention to provide an improved multimodal photon and neutron imaging device and method for implementing such combined capabilities. The present invention expands the capabilities of fast neutron imaging devices by applying a novel method of signal waveform recording and analysis, providing reliable determination of the particle types and optimal extraction of event coordinates. The method is characterized by fast on-line signal waveform approximation and parametrization.

OBJECTS AND ADVANTAGES OF THE INVENTION

A first object of the invention is to provide a method for reliable particle identification (neutron/gamma determination).

A further object of the invention is to distinguish between neutrons and photons in a mixed radiation field.

Another object of the invention is to significantly improve the accuracy of determination of the particle detection time using high-frequency (10 GHz) multisampling data acquisition including a wave form analysis to provide accuracy of time measurement in the range of few tens of picoseconds.

A further object of the invention is to improve detection of near-simultaneous particle detection events when the pulses corresponding to different events overlap ("pile-up"). Unless such pile-up signals are properly detected and processed, they contribute to inferior resolution and contrast. With the proposed method, pile-up events may be either rejected or, in case of two events with overlapping signals, may be processed to extract the characteristics of both such events.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION OF THE INVENTION

The method of multisampling data acquisition has proven itself very useful in the development of the fast neutron imaging devices. Typical matrix-type signal readout from position sensitive photosensors, such as rectangular arrays of Silicon Photo Multipliers (SiPM), or Position-Sensitive Photo Multiplier Tubes (PSPMT), benefits significantly from the extra multi-sample information recorded per each signal, which helps in determining the event position in the matrix with better accuracy.

Figure 1:
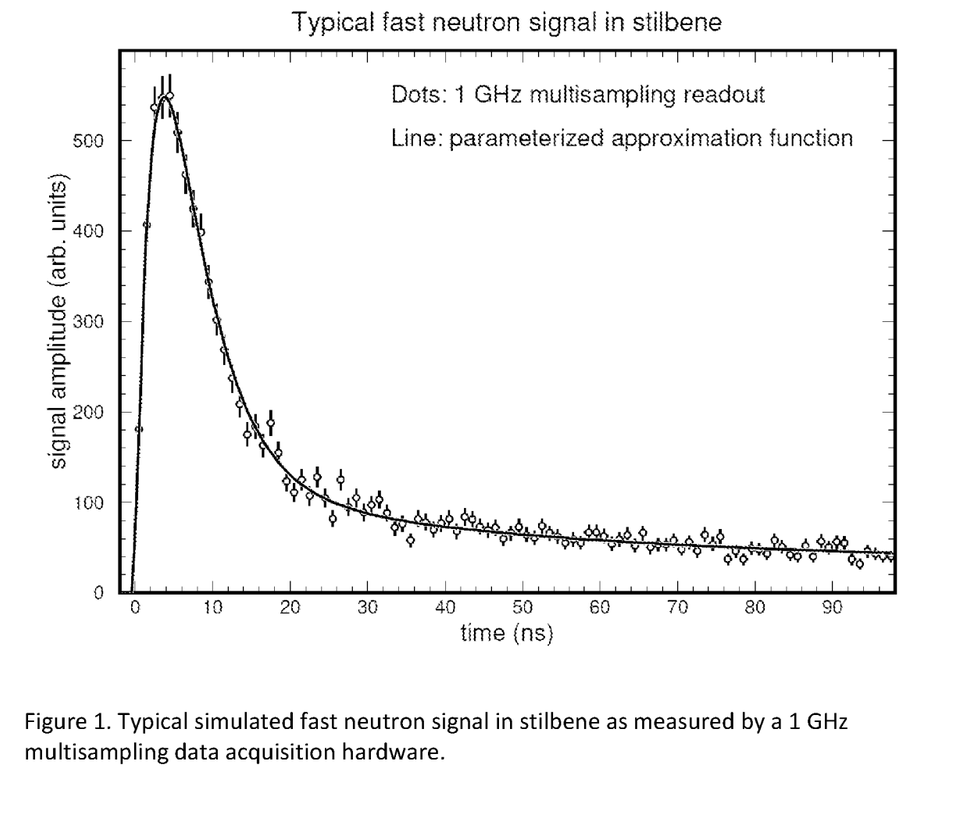
FIG. 1 is a typical simulated fast neutron signal in stilbene as measured by 1 GHz multisampling data acquisition hardware.
Figure 2:
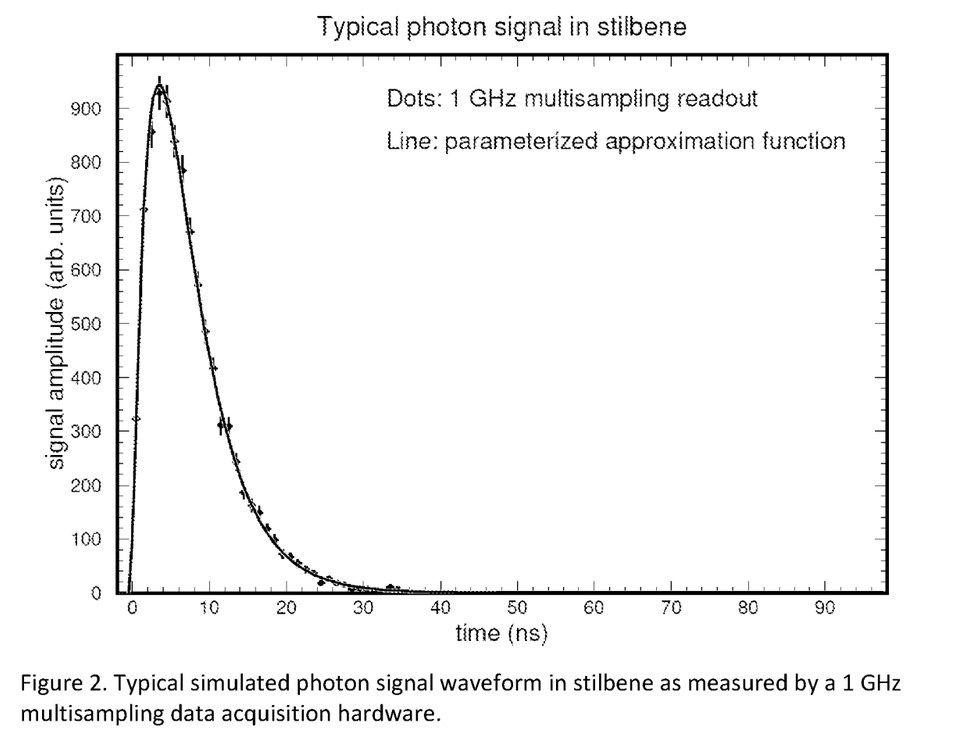
FIG. 2 is a typical simulated photon signal waveform in stilbene as measured by a 1 GHz multisampling data acquisition device according to the present invention.

Pulse shape discrimination (PSD) is a method often used for detection of fast neutrons in the presence of photon radiation backgrounds and for distinguishing between neutrons and photons in radiation detectors. The difference in the shapes of the scintillation signals is due to different excitations by neutrons (producing recoil protons with high specific ionization) and photons (producing recoil electrons with low specific ionization) in organic scintillators. FIGS. 1 and 2 depict simulated examples of the signal waveforms produced in stilbene scintillator by neutron and photon interactions.

Typical state-of-the-art implementation of the PSD method includes two measurements per signal, one giving the total charge (QTotal) integrated over the full duration of the signal, and the other integrating only the delayed component of the signal (QTail). The value of the ratio of the charges R=QTail/QTotal for the two time intervals indicates whether the considered event is produced by a neutron (high R value) or a gamma ray (small R value). The benefit of such approach is its relative simplicity and the possibility to build a relatively inexpensive electronics front end that would measure the two values.

Modern high resolution and high frequency digitizers are capable of measuring signals in more detail and thus better characterize the signals from such detectors. The multisampling approach to signal measurements makes it possible to approximate and parametrize the signal waveform as a function of time. If the approximation is good, the extracted parameters carry full information about the difference in the scintillation decay mechanisms between neutron and photon absorption events. Proper likelihood evaluation of each signal to be of a given particle type includes weighted contributions from each measurement of the signal amplitudes in the waveform. The figure of merit (FOM) for the neutron-photon separation quality when using detailed signal measurements is thus expected to be much better compared with just QTail/QTotal measure. The present invention employs a signal multisampling technique to identify the particle type by distinguishing amongst various characteristics of neutron and photon scintillation detectors. Such detailed analysis of the signal waveforms helps to better determine timing characteristics of the interaction events and, further, distinguishes and identifies so-called "pile-up" events, which is particularly important when working with high intensity beams.

The signal multisampling technique may be extended by using the instantaneous Cherenkov light, emitted by the secondary electrons produced by the photon interactions in the scintillating material, resulting in a characteristic extremely narrow peak in the signal waveform, which is used to further discriminate between photons and neutrons.

Figure 3:
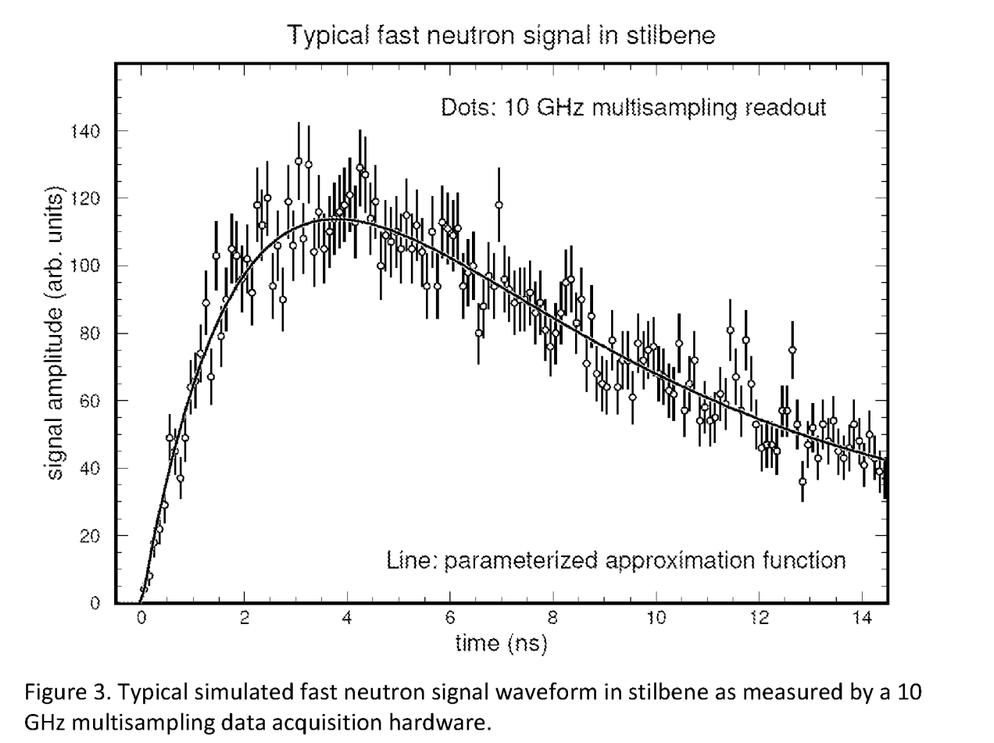
FIG. 3 is a typical simulated fast neutron signal waveform in stilbene as measured by a 10 GHz multisampling data acquisition device according to the present invention.
Figure 4:
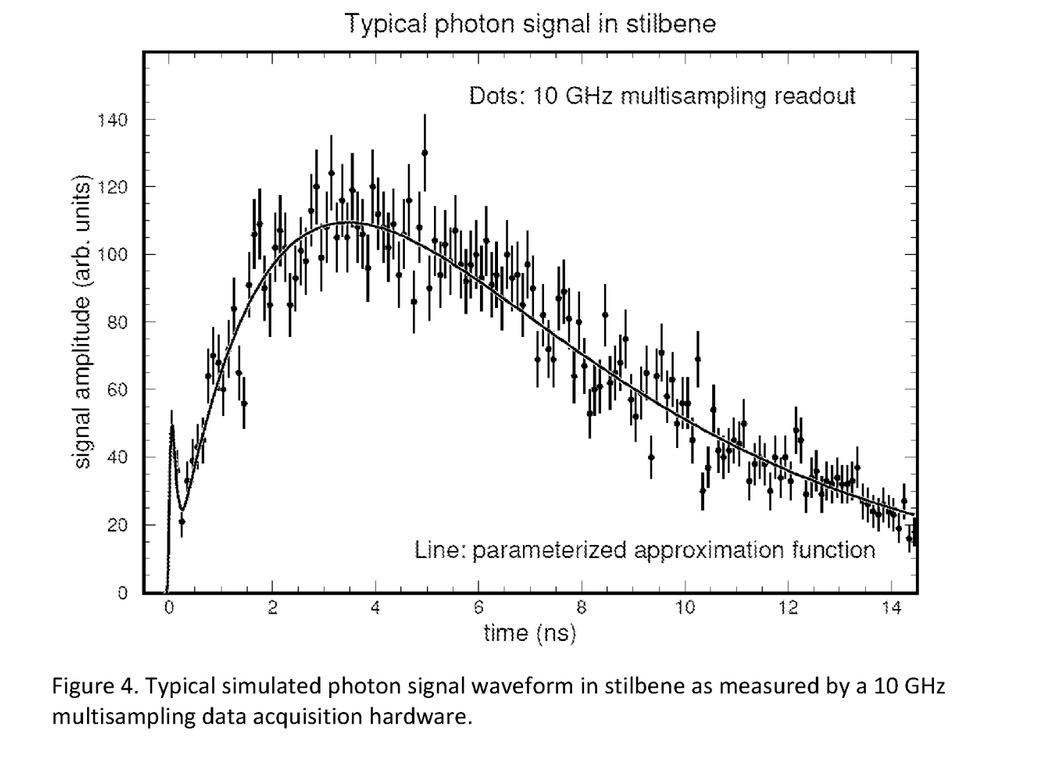
FIG. 4 is a typical simulated photon signal waveform in stilbene as measured by a 10 GHz multisampling data acquisition device according to the present invention.

Another possible advantage of the high frequency multisampling technique includes the measurement of Cherenkov radiation to improve the neutron-photon discrimination in radiation detectors. Photon interactions generate secondary electrons, which then deposit their energy in the scintillator producing scintillation light detected by the photosensors. Characteristic pulse widths depend on the type of the scintillator, and vary from few tens to few hundred nanoseconds in the typical neutron-photon detectors with PSD. At energies above few MeV the secondary electrons instantly emit Cherenkov radiation. The number of Cherenkov photons detected by the photo-sensor is quite small, but the duration of the Cherenkov radiation pulse is expected to be extremely short, well under ~0.1 ns for a typical small-size detector. Thus, such photon interaction events may exhibit a sharp spike in the signal waveform, which can be detected by a very high frequency (5-10 GHz) multisampling digitizer. Recoil protons from neutron interactions are generally slow and do not produce Cherenkov radiation, thus such measurements give extra information to help with the neutron-photon separation. Such method allows the neutron-photon discrimination also in detectors that use scintillators which, unlike stilbene, may not exhibit different scintillation timing for neutron and photon events. Detecting the Cherenkov light for distinguishing between neutrons and photons provides an opportunity to use a wider range of scintillators with characteristics more suitable for a particular application, while maintaining the ability to distinguish between the types of particles. The simulated examples of the signal waveforms produced in stilbene scintillator by neutron and photon interactions, and measured by a 10 GHz waveform digitizer, are shown in FIGS. 3 and 4.

Figure 5:
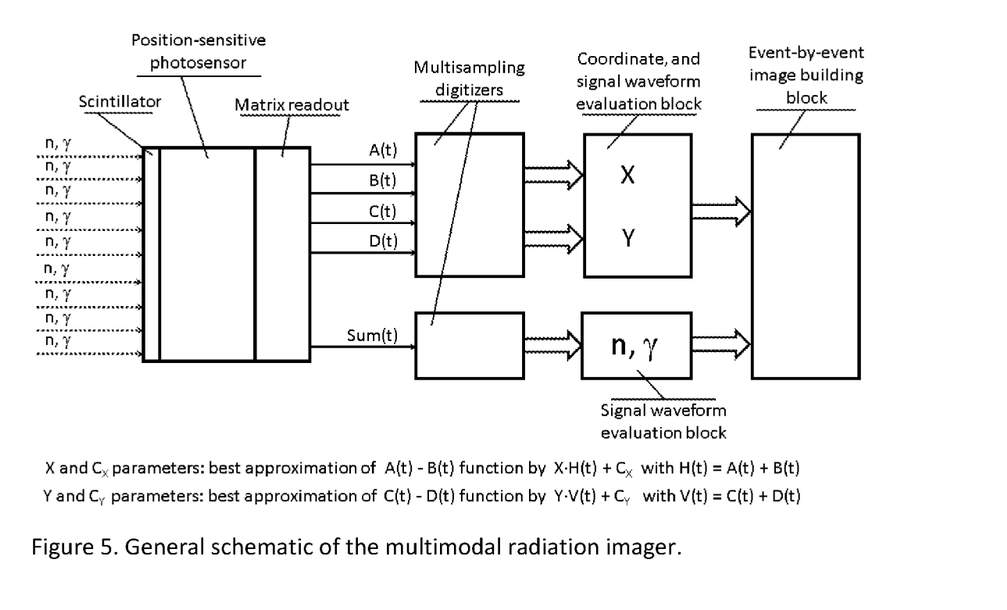
FIG. 5 is a general schematic of a multimodal radiation imager according to the present invention.

According to the properties of the matrix readout typically used in the photon and neutron imaging devices, each interaction event produces four balanced signals characterizing weighted position of the event in X and Y coordinates at the face of the detector. The schematic layout of a proposed radiation imaging device with matrix readout is shown in FIG. 5. The waveforms of all four signals are identical as they are all generated by the same initial signal, and the relative differences between the left-right and up-down signals carry the coordinate information. The signals may also exhibit relatively small constant biases.

The proposed method of optimized position determination includes using the multisampling readout of all four signals. The new technique of measuring X and Y coordinates includes finding best-fit coordinate values by approximating the difference between the left and right, or up and down signal functions by the function of their sum (multiplied by the X, or Y, coordinate parameter), and the parametrized bias values. The two-parameter fits in horizontal and vertical signal pairs result in the best possible coordinate parameter extraction, optimized for essentially any shape of the initial signal.

Figure 6:
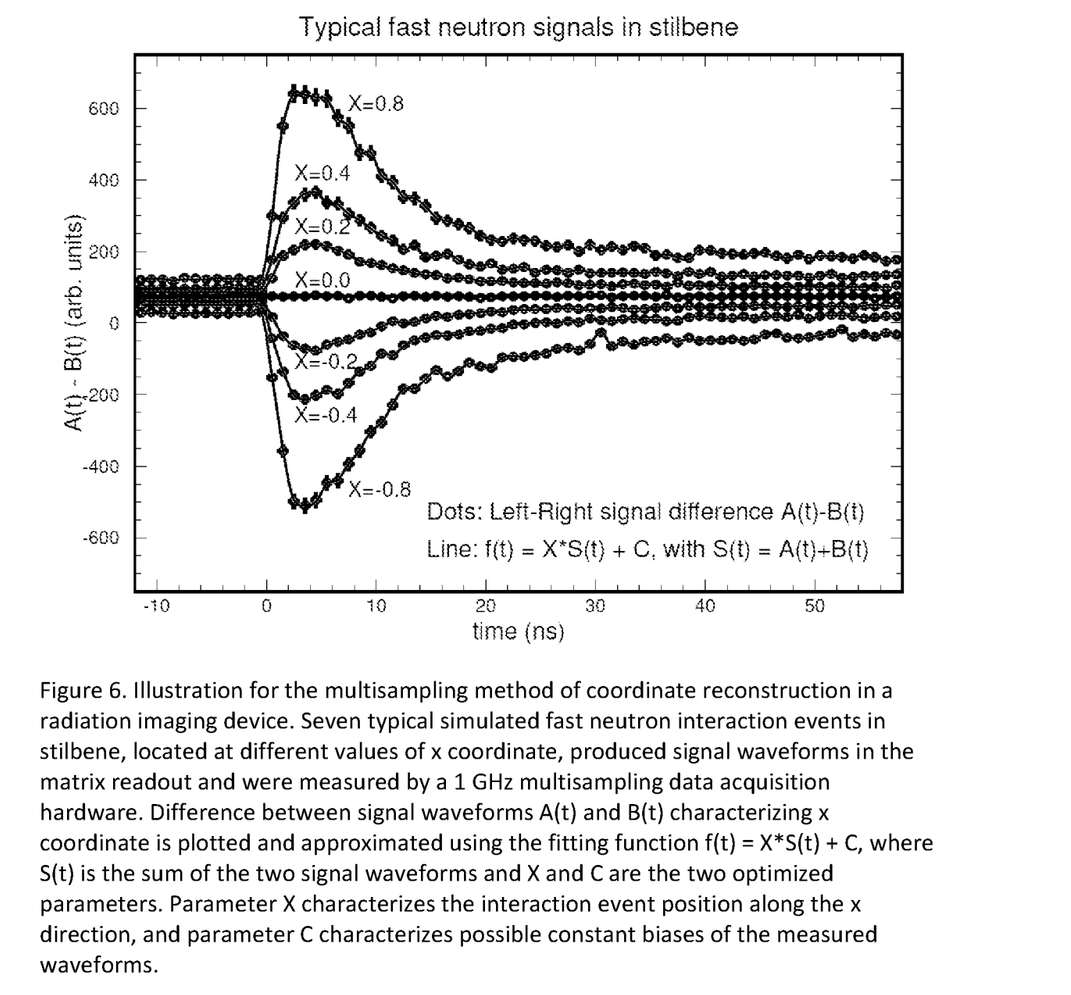
FIG. 6 is an illustration of a multisampling method of coordinate reconstruction in a radiation imaging device depicting seven typical simulated neutron interaction events in stilbene.

FIG. 6 depicts seven typical simulated fast neutron interaction events in stilbene, located at different values of x coordinate, produced signal waveforms in the matrix readout and measured by 1 GHz multisampling data acquisition hardware. Difference between signal waveforms A(t) and B(t) characterizing the x coordinate is plotted and approximated using the fitting function $f(t)=X*S(t)+C$, where $S(t)$ is the sum of the two signal waveforms and X and C are the two optimized parameters. Parameter X characterizes the interaction event position along the x direction, and parameter C characterizes possible constant biases of the measured waveforms.

Figure 7:
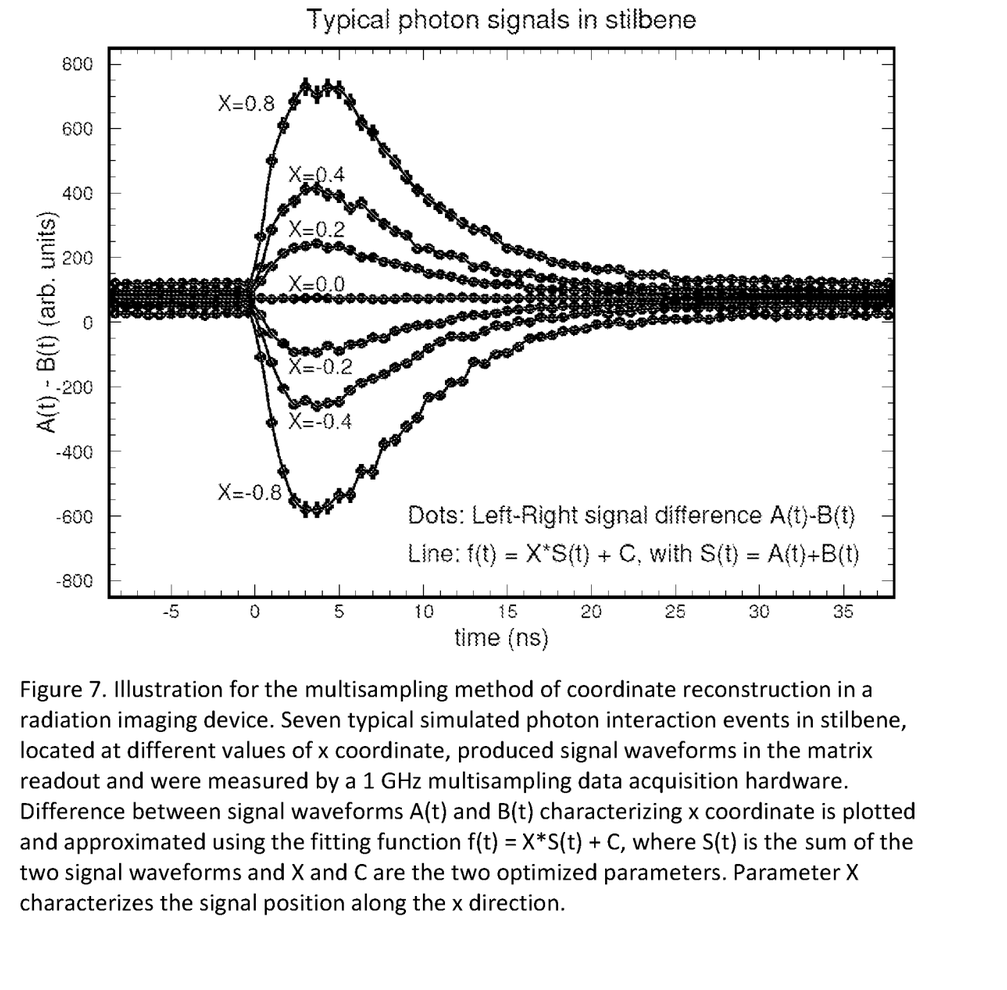
FIG. 7 is an illustration for the multisampling method of coordinate reconstruction in a radiation imaging device depicting seven typical simulated photon interaction events in stilbene.

FIG. 7 depicts seven typical simulated photon interaction events in stilbene, located at different values of x coordinate, produced signal waveforms in the matrix readout and measured by 1 GHz multisampling data acquisition hardware. Difference between signal waveforms A(t) and B(t) characterizing the x coordinate is plotted and approximated using the fitting function $f(t)=X*S(t)+C$, where $S(t)$ is the sum of the two signal waveforms and X and C are the two optimized parameters. Parameter X characterizes the signal position along the x direction.

In the current invention, multiple measurements are taken along the pulse, thereby providing significantly more information for reliably distinguishing between the shapes. The current invention uses Cherenkov light signals to distinguish between neutrons and photons in radiation detectors. Existing radiation imaging systems are not multimodal and do not use optimized multisampling data acquisition in the matrix readouts of position-sensitive photosensors both for distinguishing photon and neutron events, and for optimized coordinate measurement.

The techniques described herein could potentially be utilized in medical imaging or physics research utilizing neutron and photon radiation imaging, or in cargo radiation scanning, amongst other applications.

The present invention provides a multimodal photon and neutron imaging device and method with fast event-by-event multisampling readout and optimized pulse shape discrimination to discriminate between neutrons and photons. Various embodiments of such detectors, using position-sensitive photosensors such as Silicone Photomultipliers (SiPM), and Position-Sensitive Photomultiplier Tubes (PSPMT), and various scintillator materials are within the scope of the claimed invention.

As the invention has been described, it will be apparent to those skilled in the art that the same may be varied in many ways without departing from the spirit and scope thereof. Any and all such modifications are intended to be included within the scope of the appended claims.

What is claimed is:

1. A method for detecting and distinguishing between the neutron and photon interactions in a scintillating material, comprising:
   one or more photosensors providing photosensor signals;
   acquiring multiple samples of the photosensor signals at a high frequency;
   recording a detailed signal waveform of each sample of the signals;
   approximating the detailed signal waveform by a parameterized function specific to the type of radiation that produced the signal;
   using the fit parameters to distinguish between the types of radiation;
   measuring the instantaneous Cherenkov light emitted by the secondary electrons produced by photon interactions in the scintillating material, and
   discriminating between photons and neutrons by measuring the Cherenkov light at the extremely narrow peak in the signal waveform.

2. A method for detecting and distinguishing between the neutron and photon interactions in a scintillating material, comprising:
   one or more photosensors providing photosensor signals;
   acquiring multiple samples of the photosensor signals at a high frequency;
   recording a signal waveform for each of the photosensor signals;
   approximating the detailed signal waveform by a parameterized function specific to the type of radiation that produced the signal;
   using the fit parameters to distinguish between the types of radiation;
   measuring the instantaneous Cherenkov light emitted by the secondary electrons produced by photon interactions in the scintillating material, and
   discriminating between photons and neutrons by measuring the Cherenkov light at the narrow peak in the signal waveform.

3. The method of claim 2, comprising:
   determining an x coordinate for each of the signal waveforms at each recorded observation;
   determining the difference between signal waveforms $A(t)$ and $B(t)$ wherein the x coordinate is plotted and approximated using the fitting function $f(t)=X*S(t)+C$, where $S(t)$ is the sum of the two signal waveforms and X and C are the two optimized parameters and parameter X characterizes the signal position along the x direction.

4. The method of claim 2, comprising the frequency of acquiring multiple samples of the photosensor signals is 10 GHz.

* * * * *